United States Patent Office 3,448,122
Patented June 3, 1969

3,448,122
LACTONE STABILIZATION
Arie Klootwijk, Amsterdam, Netherlands, assignor to Shell Oil Company, New York, N.Y., a corporation of Delaware
No Drawing. Filed Nov. 14, 1966, Ser. No. 593,632
Claims priority, application Netherlands, Apr. 29, 1966, 6605772
Int. Cl. C07d 3/00
U.S. Cl. 260—343.9    1 Claim This invention relates to an improved method of stabilizing α-substituted β-lactones and to the stabilized compositions thereby obtained.

PRIOR ART

The α-substituted β-lactones are of interest as precursors of polymeric materials useful in the production of synthetic fibers. Such homopolymeric polyesters, when of high molecular weight, are highly crystalline products and have high melting points, each of which is a desirable and useful property. The lactone monomers, however, are unstable and tend to polymerize during storage and transport, particularly at elevated temperature, to form less desirable polymers of low molecular weight thereby rendering more difficult the subsequent production of high molecular weight polymer. It is therefore of advantage to provide a method for enhancing the stability of the lactone monomer and for retarding premature polymerization. The U.S. Patent 3,117,980, Jan. 14, 1964, to Martin, discloses a method of stabilizing β-lactones by adding thereto certain nitrated phenols, e.g., picric acid. Such a procedure is not entirely satisfactory due to the known tendency of such phenols to decompose, which decomposition would lead to discoloration of the lactone monomer as well as polymers produced therefrom.

THE OBJECT

It is an object of the present invention to provide an improved method of stabilizing α-substituted β-lactones and the stabilized compositions thereby produced. More particularly, it is an object to provide stabilized compositions comprising a β-lactone substituted on the alpha carbon atom thereof with from 1 to 2 alkyl substituents, as well as to provide the method of affording stabilization.

THE INVENTION

It has now been found that these objects are accomplished by the process of intimately contacting an α-substituted β-lactone with a minor amount of an addition compound of a boron trihalide and a Lewis base. The resulting lactone compositions are characterized by an increased stability at temperatures at or higher than those likely to be encountered during storage and transport as manifested by a greatly reduced tendency toward autopolymerization.

THE LACTONE MONOMER

The α-substituted β-lactone which comprises the major component of the compositions of the invention is a β-lactone of at least one substituent other than hydrogen on the carbon atom alpha to the carboxy moiety. One class of such lactones comprises those lactones of from 4 to 10 carbon atoms of the formula

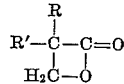

(I)

wherein R is alkyl of up to 7 carbon atoms and R' is hydrogen or R. Illustrative of such lactones are α-methyl-β-propiolactone, α-ethyl-β-propiolactone, α-butyl-β-propiolactone, α,α-dimethyl-β-propiolactone, α,α-diethyl-β-propiolactone, α-ethyl-α-tert-butyl-β-propiolactone and α-methyl-α-hexyl-β-propiolactone. In general, preferred lactones of the above Formula I are those wherein both R and R' are alkyl, and particularly satisfactory are compositions wherein the lactone component is α,α-dimethyl-β-propiolactone.

THE STABILIZER

The above-described α-substituted β-lactones are stabilized by intimately contacting the lactone with a minor proportion of an addition compound of (a) a boron trihalide and (b) a Lewis base, that is, a material which serves as a base in the sense that it undergoes salt formation by donating an electron pair to a second atom, in this case the boron of the boron trihalide, thereby rendering stable the electronic configuration of the second atom. The resulting product is herein termed an addition compound.

The boron trihalide component of the stabilizer is a trihalo derivative of boron. Although boron trihalides such as boron trichloride, boron tribromide and boron triiodide are operable, best results are obtained when the boron trihalide component of the stabilizer is boron trifluoride.

As previously stated, the second component of the addition compounds found to be useful as lactone stabilizers is a Lewis base. In a broad sense the term Lewis base is applicable to any species molecular or ionic, organic or inorganic, which incorporates within the structure thereof an unshared pair of electrons capable of being shared with the boron trihalide moiety. As particularly applied to the stabilizers of the invention, the preferred Lewis bases are non-ionizable, organic molecular species which coordinate by means of an unshared electron pair with the boron trihalide.

Illustrative of one class of such Lewis bases are organic carbonylic compounds of up to 10 carbon atoms including aldehydes, e.g., acetaldehyde, propionaldehyde, crotonaldehyde, benzaldehyde, hexanal and decanal; ketones such as acetone, methyl ethyl ketone, acetophenone and methyl isobutyl ketone; and esters, particularly lower alkyl esters such as ethyl acetate, methyl benzoate, ethyl propionate, propyl butyrate and methyl hexanoate.

A second class of suitable Lewis bases comprises the ethers of up to 15 carbon atoms, particularly monoethers such as diethyl ether, dipropyl ether, methyl propyl ether, methyl butyl ether, ethyl lauryl ether, dihexyl ether and propyl octyl ether. Diethyl ether is a particularly preferred Lewis base of this class.

Best results, however, are obtained when the Lewis base comprises a derivative of a Group V–A element of an atomic number from 7 to 51 inclusivxe, i.e., nitrogen, phosphorus, arsenic or antimony. One class of such Group V–A derivatives is represented by organic compounds of the formula

(II)

wherein E is a Group V–A element of atomic number from 7 to 51 inclusive, preferably from 7 to 15 inclusive, and R" independently is hydrogen or hydrocarbon of up to 20 carbon atoms, preferably hydrocarbon of up to 10 carbon atoms free from aliphatic unsaturation. Illustrative R" groups include alkyl groups such as methyl, ethyl, propyl, hexyl, decyl, cyclopentyl, cyclooctyl and 2,3-dimethylcyclohexyl; aralkyl groups such as benzyl and β-phenylethyl; aryl groups such as phenyl and naphthyl; and alkaryl groups including tolyl, xylyl, p-tert-butylphenyl, 2,4-diethylphenyl and 2,4,6-trimethylphenyl. Exemplary Lewis bases of the above Formula II include amines such as methylamine, ethylamine, cyclohexylamine, dodecylamine, isopropylamine, isobutylamine, aniline, dimethylamine, diethylamine, N-methylaniline, diphenylamine, trimethylamine, methyldipropylamine, lauryldibenzylamine, trilaurylamine, trihexylamine, tricyclohexylamine, triphenylamine and N,N-diethylaniline; phosphines such as ethylphosphine, dipropylphosphine, phenylphosphine, ethyltolylphosphine, diethyllaurylphosphine, triethylphosphine and tripenylphosphine; arsines such as dimethylarsine, diethylhexylarsine, phenylarsine and triphenylarsine; and stibines such as dipropylmethylstibine and triphenylstibine.

Also suitable are Lewis bases of the above Formula II wherein two R″ groups together form a divalent hydrocarbon moiety of from 4 to 20 carbon atoms. Such Lewis bases are heterocyclic in character and are illustrated by pyrrolidine, N-methylpyrrolidine, 1,2-dimethylpyrrolidine, piperidine, N-propylpyridine, 1-ethylphospholidine, 1-phenylphosphorinane, 3,6-dimethyl-1-phenylphosphepane, 9-phenyl-9-phosphabicyclo(4.2.1)nonane and 9-butyl-9-phosphabicyclo(3.3.1)nonane.

In general, the preferred Lewis bases of the class represented by the above Formula II are those wherein each R″ is phenyl or substituted-phenyl of up to 3 alkyl substituents. Particularly preferred is triphenyl-E wherein E is nitrogen or phosphorus.

The stabilizer is employed in a relatively minor amount. Effective stabilization is obtained when the amount of stabilizer employed in the lactone composition is from about 0.0001% mole to about 0.5% mole based on the total amount of composition. Amounts of stabilizer from about 0.001% mole to about 0.05% mole on the same basis are preferred.

The stabilizer compositions are prepared by intimately contacting the lactone with the stabilizer, thereby obtaining an essentially homogeneous mixture. The precise method of obtaining intimate contacting is not critical and methods such as dissolving, shaking, stirring and the like are suitable.

As previously stated the process of the invention is useful in providing compositions comprising the α-substituted β-propiolactone which exhibit enhanced storage and thermal stability as shown by a reduced tendency toward the autopolymerization generally exhibited by unstabilized β-propiolactones. The stabilized compositions are polymerizable by known catalytic methods to high molecular weight polymers without appreciable detriment arising from the presence of the stabilizer. If desired, however, the stabilizer is separated from the lactone monomer by conventional methods, e.g., flash distillation or selective extraction, prior to polymerization.

The stabilized lactone compositions are particularly useful in providing precursors of high molecular weight polymers due to the relatively small proportion of low molecular weight polymer formed during the storage and handling of the lactone monomer composition prior to polymerization.

To more fully illustrate the improved process of the invention and the stabilized compositions thereby obtained, the following example is provided. It should be understood that the details thereof are not to be regarded as limitations as they may be varied as will be understood by one skilled in the this art.

Example I

A quantity of α,α-dimethyl-β-propiolactone was prepared by reacting bromopivalic acid with an equivalent amount of sodium hydroxide at room temperature in an aqueous medium while extracting the aqueous solution with chloroform. The α,α-dimethyl-β-propiolactone was subsequently purified to less than 0.0001% weight of impurities detectable by gas-liquid chromatographic analysis.

A series of compositions was prepared by adding to samples of the purified lactone controlled amounts of boron trihalide-Lewis base stabilizers. In each case, the stabilizing effect was measured by maintaining the composition at 90° C. and determining the time required for the formation of 0.1% wt. of polymer. The results of the examination of these compositions is shown in the following table wherein the term "Time" relates the time in hours required for the formation of 0.1% wt. of polymer.

TABLE

| Stabilizer | Conc., percent mole | Time |
| --- | --- | --- |
| None | 0 | 0.1 |
| $BF_3 \cdot (C_6H_5)_3P$ | 0.005 | 500 |
| $BF_3 \cdot (C_6H_5)_3P$ | 0.01 | 500 |
| $BF_3 \cdot (C_6H_5)_3N$ | 0.005 | 340 |
| $BF_3 \cdot (C_6H_5)_3N$ | 0.05 | 395 |
| $BF_3 \cdot (C_2H_5)_2O$ | 0.0005 | 124 |

For purposes of comparison, a composition was prepared containing 0.005% mole of picric acid. When treated in identical manner, the time required for formation of 0.1% wt. of polymer was 46 hours.

I claim as my invention:
1. A stabilized composition consisting essentially of (a) α,α-dimethyl-β-propiolactone and (b) as stabilizer from about 0.001% mole to about 0.05% mole based on the total composition of an addition compound of boron trifluoride and an organic compound selected from triphenylphosphine and triphenylamine.

References Cited

UNITED STATES PATENTS 2,356,459   8/1944   Küng _____ 260—343.9

ALEX MAZEL, *Primary Examiner.*

J. A. NARCAVAGE, *Assistant Examiner.*